US012809780B2

(12) United States Patent
Kalamatianos et al.

(10) Patent No.: US 12,809,780 B2
(45) Date of Patent: Nov. 24, 2026

(54) MANAGING CACHED DATA USED BY PROCESSING-IN-MEMORY INSTRUCTIONS

(71) Applicant: ADVANCED MICRO DEVICES, INC., Santa Clara, CA (US)

(72) Inventors: John Kalamatianos, Boxborough, MA (US); Jagadish B. Kotra, Austin, TX (US); Gagandeep Panwar, Blacksburg, VA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 429 days.

(21) Appl. No.: 17/473,242

(22) Filed: Sep. 13, 2021

(65) Prior Publication Data

US 2022/0188233 A1 Jun. 16, 2022

Related U.S. Application Data

(63) Continuation-in-part of application No. 17/123,270, filed on Dec. 16, 2020, now Pat. No. 11,868,777.

(51) Int. Cl.

*G06F 9/30* (2018.01)
*G06F 9/38* (2018.01)
*G06F 12/0817* (2016.01)

(52) U.S. Cl.

CPC ...... *G06F 12/0828* (2013.01); *G06F 9/30043* (2013.01); *G06F 9/3834* (2013.01); *G06F 9/3877* (2013.01); *G06F 2212/621* (2013.01)

(58) Field of Classification Search

CPC .. G06F 9/30043; G06F 9/3009; G06F 9/3834; G06F 9/3877

See application file for complete search history.

(56) References Cited

U.S. PATENT DOCUMENTS

| | | | |
|---|---|---|---|
| 5,903,916 | A | 5/1999 | Pawlowski et al. |
| 6,263,406 | B1 | 7/2001 | Uwano et al. |
| 6,553,465 | B1 | 4/2003 | Takusagawa |
| 6,601,153 | B1 | 7/2003 | Engelbrecht et al. |
| 6,944,746 | B2 | 9/2005 | So |
| 6,973,541 | B1 | 12/2005 | Williams et al. |

(Continued)

FOREIGN PATENT DOCUMENTS

| | | |
|---|---|---|
| CN | 104106043 A | 10/2014 |
| JP | 2009075101 A | 4/2009 |

(Continued)

OTHER PUBLICATIONS

International Search Report and Written Opinion, PCT/US2021/063345, Apr. 4, 2022, 9 pages.

(Continued)

*Primary Examiner* — Jacob Petranek

(57) ABSTRACT

A system-on-chip configured for eager invalidation and flushing of cached data used by PIM (Processing-in-Memory) instructions includes: one or more processor cores; one or more caches and an I/O (input/output) die comprising logic to: receive a cache probe request, wherein the cache probe request including a physical memory address associated with a PIM instruction, and the PIM instruction is to be offloaded to a PIM device for execution; and issue, based on the physical memory address, a cache probe to one or more of the caches prior to receiving the PIM instruction for dispatch to the PIM device.

20 Claims, 4 Drawing Sheets

(56) References Cited

U.S. PATENT DOCUMENTS

| | | | |
|---|---|---|---|
| 7,047,393 B2 | 5/2006 | Paver et al. | |
| 8,359,462 B1 | 1/2013 | Khan et al. | |
| 9,348,539 B1 | 5/2016 | Saxena et al. | |
| 9,575,815 B1 | 2/2017 | Guthrie et al. | |
| 10,061,588 B2 | 8/2018 | Gschwind et al. | |
| 10,282,292 B2 | 5/2019 | Prodromou et al. | |
| 11,043,259 B2 | 6/2021 | Wentzlaff et al. | |
| 11,355,170 B1 | 6/2022 | Yudanov | |
| 11,568,907 B2 | 1/2023 | Mathew et al. | |
| 11,594,274 B2 | 2/2023 | Murphy | |
| 11,625,249 B2 | 4/2023 | Kotra et al. | |
| 11,663,008 B2 | 5/2023 | Lee et al. | |
| 11,868,777 B2 | 1/2024 | Kalamatianos et al. | |
| 11,921,634 B2 | 3/2024 | Kotra et al. | |
| 12,197,378 B2 | 1/2025 | Kotra et al. | |
| 2005/0015538 A1 | 1/2005 | Van't Wout et al. | |
| 2005/0246698 A1 | 11/2005 | Chung | |
| 2007/0174685 A1 | 7/2007 | Banks et al. | |
| 2008/0046692 A1 | 2/2008 | Michalak et al. | |
| 2008/0244185 A1* | 10/2008 | O'Krafka | G06F 12/128 711/E12.075 |
| 2009/0071254 A1 | 3/2009 | Knowles et al. | |
| 2010/0153761 A1 | 6/2010 | Nishioka | |
| 2011/0242113 A1 | 10/2011 | Keall et al. | |
| 2012/0159077 A1 | 6/2012 | Steely, Jr. et al. | |
| 2013/0021353 A1 | 1/2013 | Drebin et al. | |
| 2013/0086367 A1 | 4/2013 | Gschwind et al. | |
| 2014/0049551 A1 | 2/2014 | Rao et al. | |
| 2014/0281405 A1 | 9/2014 | Streett et al. | |
| 2016/0092238 A1 | 3/2016 | Codrescu et al. | |
| 2016/0155491 A1 | 6/2016 | Roberts et al. | |
| 2016/0210154 A1 | 7/2016 | Lin | |
| 2017/0060588 A1 | 3/2017 | Choi | |
| 2017/0123987 A1 | 5/2017 | Cheng et al. | |
| 2017/0262369 A1* | 9/2017 | Murphy | G06F 12/084 |
| 2017/0344480 A1 | 11/2017 | Beard et al. | |
| 2018/0089081 A1 | 3/2018 | Ramalingam | |
| 2018/0188961 A1 | 7/2018 | Venkatesh et al. | |
| 2018/0285264 A1 | 10/2018 | Kayiran et al. | |
| 2018/0336035 A1* | 11/2018 | Choi | G06F 9/35 |
| 2018/0373541 A1 | 12/2018 | Ros et al. | |
| 2019/0050325 A1 | 2/2019 | Malladi et al. | |
| 2019/0079677 A1 | 3/2019 | Malladi et al. | |
| 2019/0138313 A1 | 5/2019 | Lin | |
| 2019/0377580 A1 | 12/2019 | Vorbach et al. | |
| 2020/0035291 A1 | 1/2020 | Kasibhatla et al. | |
| 2020/0174931 A1 | 6/2020 | Williams et al. | |
| 2020/0183696 A1 | 6/2020 | Williams et al. | |
| 2020/0192757 A1 | 6/2020 | Qin et al. | |
| 2020/0218540 A1 | 7/2020 | Kesiraju et al. | |
| 2020/0294558 A1 | 9/2020 | Yu et al. | |
| 2021/0271680 A1 | 9/2021 | Lee et al. | |
| 2021/0349826 A1 | 11/2021 | Roy et al. | |
| 2022/0076717 A1 | 3/2022 | Mathew et al. | |
| 2022/0156081 A1 | 5/2022 | Seo et al. | |
| 2022/0188117 A1 | 6/2022 | Kalamatianos et al. | |
| 2022/0206817 A1 | 6/2022 | Kotra et al. | |
| 2022/0206855 A1 | 6/2022 | Challapalle et al. | |
| 2022/0237041 A1 | 7/2022 | Lee et al. | |
| 2022/0292033 A1 | 9/2022 | Yu et al. | |
| 2023/0205693 A1 | 6/2023 | Kotra et al. | |
| 2023/0244442 A1 | 8/2023 | Lee et al. | |
| 2023/0244492 A1 | 8/2023 | Kotra et al. | |
| 2023/0393849 A1 | 12/2023 | Kotra et al. | |
| 2024/0126552 A1 | 4/2024 | Kalamatianos et al. | |

FOREIGN PATENT DOCUMENTS

| | | | |
|---|---|---|---|
| JP | 2013025823 | A | 2/2013 |
| JP | 2018198086 | A | 12/2018 |
| JP | 2019036298 | A | 3/2019 |
| JP | 2019053725 | A | 4/2019 |
| JP | 2019531546 | A | 10/2019 |
| WO | 2013118008 | A1 | 8/2013 |
| WO | 2014120193 | A1 | 8/2014 |
| WO | 2018046850 | A1 | 3/2018 |
| WO | 2021028723 | A2 | 2/2021 |
| WO | 2022132795 | A1 | 6/2022 |
| WO | 2022146793 | A1 | 7/2022 |

OTHER PUBLICATIONS

International Search Report and Written Opinion, PCT/US2022/052886, Mar. 20, 2023, 11 pages.

Santos et al., "Processing in 3D memories to speed up operations on complex data structures," 2018 Design, Automation & Test in Europe Conference & Exhibition (DATE), Date of Conference: Mar. 19-23, 2018, Dresden, Germany, DOI: 10.23919/DATE.2018.8342135, Date Added to IEEE Xplore: Apr. 23, 2018, 4 pages.

Aga et al., "Co-ML: A Case for Collaborative ML Acceleration using Near-Data Processing", MemSys '19: Proceedings of the International Symposium on Memory Systems, DOI: 10.1145/3357526.3357532, dated Sep. 2019, 12 pages.

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), DOI: 10.1145/2749469.2750385, Jun. 2015, 13 pages.

Boroumand et al., "LazyPIM: Efficient Support for Cache Coherence in Processing-in-Memory Architectures", IEEE Computer Architecture Letters, vol. 16, Issue 1, DOI:10.1109/LCA.2016.2577557, dated Jun. 2016, 12 pages.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA.2015.7056040, dated Mar. 2015, 13 pages.

Gao et al., "ComputeDRAM: In-Memory Compute Using Off-the-Shelf DRAMs", Proceedings of the 52nd Annual IEEE/ACM International Symposium on Microarchitecture (MICRO '52), Oct. 2019, pp. 100-113, IEEE, URL: https://doi.org/10.1145/3352460.3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, debi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Kim, "A Journey to a Commercial-Grade Processing-In-Memory (PIM) Chip Development", The 27th IEEE International Symposium on High-Performance Computer Architecture (HPCA-27), Mar. 2021, Samsung, Seoul, South Korea, URL: https://hpca-conf.org/2021/keynotes/, 3 pages (abstract only, specifically pp. 2-3).

Loh et al., "A Processing-in-Memory Taxonomy and a Case for Studying Fixed-function PIM", 3rd Workshop on Near-Data Processing, Dec. 2013, 4 pages, University of Utah.

(56) References Cited

OTHER PUBLICATIONS

Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.

Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.

Nyasulu, "System Design for a Computational-RAM Login-In-Memory Parallel Processing Machine", PHD Thesis, May 1999, 196 pages, Carleton University, Ottawa, ON, Canada.

Pugsley et al., "Analyzing the Impact of 3D-stacked Memory+ Logic Devices on MapReduce Workloads", 2014 IEEE International Symposium on Performance Analysis of Systems and Software (ISPASS), Mar. 2014, pp. 190-200, EEE, United States.

Seshadri et al., "RowClone: Fast and Energy-Efficient In-DRAM Bulk Data Copy and Initialization", 2013 46th Annual IEEE/ACM International Symposium on Microarchitecture (Micro), DOI:10.1145/2540708.2540725, dated Dec. 2013, 13 pages.

Singh et al., "A Review of Near-Memory Computing Architectures: Opportunities and Challenges", EuroMicro Conference on DSD, Aug. 2018, 10 pages, IEEE, United States, DOI: 10.1109/DSD.2018.00106.

Yang et al., "A Processing-in-Memory Architecture Programming Paradigm for Wireless Internet-of-Things", Applications, Sensors Journal, Jan. 2019, 23 pages, MDPI, Basel, Switzerland.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

International Search Report and Written Opinion, PCT/US2021/064663, May 10, 2022, 12 pages.

Jonathan Corbet, AutoNUMA: the other approach to NUMA scheduling, URL: https://lwn.net/Articles/488709/, dated Mar. 27, 2012, 5 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference (ISSCC),URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.

Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.

Kim et al., "Silent-PIM: Realizing the Processing-in-Memory Computing With Standard Memory Requests," IEEE Transactions on Parallel and Distributed Systems, Vo. 33, No. 2, Feb. 1, 2022, 12 pages.

Nai et al., "GraphPIM: Enabling Instruction-Level PIM Offloading in Graph Computing Frameworks," 2017 IEEE InternationalSymposium on High Performance Computer Architecture (HPCA), Date of Conference: Feb. 4-8, 2017, Austin, TX, DOI: 10.1109/HPCA.2017.54, Date Added to IEEE Xplore: May 8, 2017, 12 pages.

Xu et al., "TUPIM: A Transparent and Universal Processing-in-Memory Architecture for Unmodified Binaries," GLSVLSI '20: Proceedings of the 2020 on Great Lakes Symposium on VLSI, Sep. 7-9, 2020, Virtual Event, China, https://doi.org/10.1145/3386263.3406896, Published: Sep. 7, 2020, 6 pages.

Ghose et al., "Processing-in-memory: A workload-driven perspective," IBM Journal of Research and Development, DOI: 10.1147/JRD.2019.2934048, vol. 63, Issue 6, Date of Publication: Aug. 8, 2019, 19 pages.

Kim et al., "Exploration of a PIM Design Configuration for Energy-Efficient Task Offloading," 2019 IEEE International Symposium on Circuits and Systems (ISCAS), Date of Conference: May 26-29, 2019, Sapporo, Japan, DOI: 10.1109/ISCAS.2019.8702339, Date Added to IEEE Xplore: May 1, 2019, 4 pages.

Lee et al., "Design of Processing-"Inside"—Memory Optimized for DRAM Behaviors," IEEE Access, vol. 7,DOI: 10.1109/ACCESS.2019.2924240; Date of Publication: Jun. 21, 2019, 16 pages.

Pattnaik et al., "Scheduling Techniques for GPU Architectures with Processing-In-Memory Capabilities," PACT '16: Proceedings of the 2016 International Conference on Parallel Architectures and Compilation, DOI: http://dx.doi.org/10.1145/2967938.2967940, Published Sep. 11, 2016, 14 pages.

* cited by examiner

MANAGING CACHED DATA USED BY PROCESSING-IN-MEMORY INSTRUCTIONS

CROSS-REFERENCE TO RELATED APPLICATION

This application is a continuation in part of U.S. patent application Ser. No. 17/123,270, filed Dec. 16, 2020, the entirety of which is hereby incorporated by reference.

BACKGROUND

Computing systems often include a number of processing resources, such as processors or processor cores, which can retrieve instructions, execute instructions, and store the results of executed instructions to memory. A processing resource can include a number of functional units such as arithmetic logic units (ALUs), floating point units (FPUs), and combinatorial logic blocks, among others. Typically, such functional units are local to the processing resources. That is, functional units tend to be implemented as part of a processor and are separate from memory devices in which data to be operated upon is retrieved and data forming the results of operations is stored. Such data can be accessed via a bus between the processing resources and memory. To reduce the amount of accesses to fetch or store data in memory—specifically in main memory—computing systems employ a cache hierarchy that temporarily stores recently accessed or modified data in a memory device that is quicker and more power efficient to access than main memory. Such cache memory is sometimes referred to as being 'closer' to the processor or processor core.

Processing performance can be improved by offloading operations that would normally be executed in the functional units to a processing-in-memory (PIM) device. PIM refers to an integration of compute and memory for execution of instructions that would otherwise be executed by a computer system's primary processor or processor cores. In some implementations, PIM devices incorporate both memory and functional units in a single component or chip. Although PIM is often implemented as processing that is incorporated 'in' memory, this specification does not limit PIM so. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, instructions executed in a PIM architecture are executed 'closer' to the memory accessed in executing the instruction. In this way, a PIM device can save time by reducing or eliminating external communications and can also conserve power that would otherwise be necessary to process memory communications between the processor and the memory.

Some portions of phases of applications may be well-suited for offloading to a PIM device. Some applications during execution, for example, have phases of low or no temporal data reuse. During such phases, there are frequent misses in the cache hierarchy and frequency fetching of data from main memory. In addition, such phases can also exhibit low computational intensity (in terms of FLOPs per byte of data accessed, for example). During such phases, energy efficiency and performance drops because data movement is high and the phases are memory bound. A phase is memory bound in that the rate which the instructions of the phase are progress is limited by the amount of memory available and/or speed of memory access. Accordingly, these phases are particularly well-suited for offloading to a PIM device.

DETAILED DESCRIPTION

Figure 1:
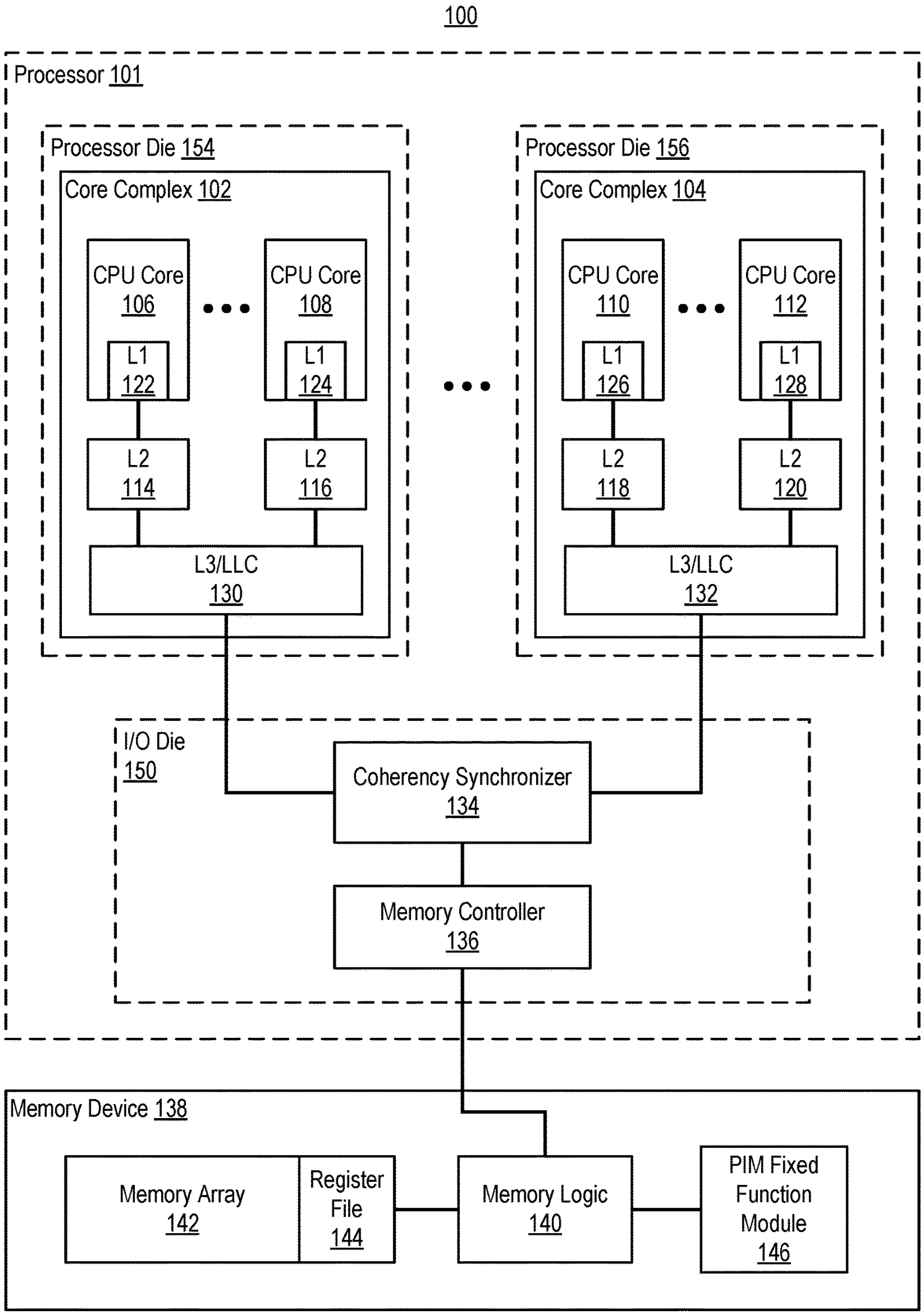
FIG. 1 sets for a block diagram illustrating an example system 100 that supports execution of PIM instructions in which a PIM device is implemented as a component of a memory device.

Processing-in-Memory (PIM) architectures support offloading instructions for execution in or near memory, such that bandwidth on the data link between the processor and the memory is conserved and power consumption of the processor is reduced. However, data that is to be accessed for execution of a PIM instruction must remain coherent throughout a memory hierarchy, including the various levels of cache, to ensure functional correctness of PIM code.

To enable computation by a PIM device, instructions offloaded to the PIM device must use, or operate on, the most recent version of data. However, the most recent version of the data to be used in execution of a PIM instruction could be present in the CPU caches as a result of being accessed and updated by non-PIM instructions, preceding the PIM code execution. To that end, in some PIM architectures, offloads of PIM instructions are carried out in a manner to ensure that data that is resident in a cache and is to be used in execution of a PIM instruction is flushed from the cache to memory.

In such an architecture, PIM instructions touching memory, such as PIM Load and PIM Store instructions, undergo address translation in the core as regular load or store instructions. However, unlike regular load or store instructions, once the address translation is completed, the instructions are marked as retired without fetching data from the cache hierarchy. That is, PIM instructions are immediately considered executed by the PIM device once address translation is completed without fetching operand data for the instructions. At retire time, PIM instructions are placed in a PIM queue and are eventually dispatched to the PIM device for execution. As part of the dispatch flow, PIM instructions access the System Probe Filter (SPF) to perform a lookup and determine whether data to be used in execution of the instruction is present in a cache. If the SPF lookup results in a hit (meaning the data is present in a cache), a probe request is sent to the corresponding cache-levels to invalidate or flush the data to memory.

If the data to be used by a PIM read instruction is in a cache and the data is marked dirty, a PIM read request will wait to be dispatched until the data is flushed from the cache to memory. Such a wait limits the dispatch bandwidth of PIM read instructions to PIM devices. In cases in which the data to be used by a PIM instruction is clean (regardless of PIM instruction type), the PIM instruction is forwarded to the PIM device while the data is invalidated in the cache. This invalidation can safely occur because memory has the same copy as the data in the cache or because the instruction is a PIM write request that will overwrite the copy of the data that is resident in the cache.

Because a probe response from a cache can take several cycles, PIM instructions can remain in the PIM queues for relatively long periods of time, thereby limiting the PIM instruction dispatch bandwidth. Moreover, PIM instructions cannot be forwarded to the PIM device out of order. The original dispatch order from the CPU core must match the program order. This order has to be preserved all the way to the PIM device. Therefore, if a PIM instruction that reads or writes memory has to wait in the PIM queues for a probe response that needs to flush out PIM data from the caches, all younger PIM requests from the same thread need to wait as well.

To that end, various implementations and apparatus for early or 'eagerly' invalidating or flushing PIM data from caches are disclosed in this specification. In some implementations, a system-on-chip (SOC) is provided for eagerly invalidating and flushing cached data used by PIM instructions. The SOC includes one or more processor cores, one or more caches, and an I/O (input/output) die. The I/O die includes logic to receive a cache probe request, where the cache probe request includes a physical memory address associated with a PIM instruction and the PIM instruction is to be offloaded to a PIM device for execution. The I/O die logic is also configured to issue, based on the physical memory address, a cache probe to one or more of the caches prior to receiving the PIM instruction for dispatch to the PIM device. In some implementations, the cache probe is issued to one or more caches to invalidate or flush data associated with the physical memory address.

In some implementations, the I/O die includes a coherency synchronizer that synchronizes cache states for a plurality of processor cores. The coherency synchronizer includes logic to receive the PIM instruction after the PIM instruction is dispatched by a processor core. The coherency synchronizer also includes logic to dispatch the PIM instruction to the PIM device when probe responses to the cache probe have been received from the one or more caches.

In some implementations, a processor core of the SOC is configured to resolve the physical memory address associated with the PIM instruction and dispatch a cache probe request based on the resolved physical memory address to the coherency synchronizer. The cache coherency synchronizer issues the cache probe to the one or more caches before the processor core completes the PIM instruction.

In some implementations, a processor core of the SOC is also configured to resolve the physical memory address, wherein the physical memory address is specified in a cache control instruction associated with the PIM instruction. The processor core is also configured to dispatch a cache probe request based on the physical memory address to the coherency synchronizer. The cache coherency synchronizer issues the cache probe to the one or more caches before the processor core completes the PIM instruction.

In additional implementations, a SOC is configured for eager invalidation and flushing of PIM data from cache according to various implementations of the present disclosure and includes one or more processor cores, one or more caches, and an I/O die. The I/O die includes logic that, based on at least one first PIM instruction specifying a first physical memory address, is configured to speculate a second physical memory address. The logic of the I/O die is also configured to issue a cache probe to one or more caches before encountering a second PIM instruction that specifies the second physical memory address. In some implementations, the second physical memory address is speculated based on a pattern of memory accesses of prior PIM instructions.

In some implementations, the I/O die of the SOC includes a coherency synchronize configured to: receive the second PIM instruction after the second PIM instruction is dispatched by a processor core; determine, upon receipt of the second PIM instruction, whether probe responses to the cache probe have been received from the one or more caches; and dispatch the second PIM instruction to the PIM device when probe responses to the cache probe have been received from the one or more caches.

Methods of eagerly invalidating or flushing PIM data from caches are also disclosed in this specification. Such eager invalidation or flushing of PIM data includes, in some implementations, receiving a cache probe request, where the cache probe request includes a physical memory address associated with a PIM instruction and the PIM instruction is to be offloaded to a PIM device for execution. The eager invalidation or flushing of PIM data also includes issuing a cache probe to one or more caches based on the physical memory address prior to receiving the PIM instruction for dispatch to the PIM device. The cache probe is issued to one or more caches to invalidate or flush data associated with the physical memory address.

In some implementations, eagerly invalidating or flushing PIM data also includes receiving, at a coherency synchronizer, the PIM instruction after the PIM instruction is dispatched by a processor core; determining, upon receipt of the PIM instruction, whether probe responses to the cache probe have been received from the one or more caches; and dispatching the PIM instruction to the PIM device when probe responses to the cache probe have been received from the one or more caches. In such implementations, the coherency synchronizer synchronizes cache states for a plurality of processor cores.

In some implementations, eagerly invalidating or flushing PIM data also includes resolving, by a processor core, the physical memory address, where the physical memory address is specified in the PIM instruction and dispatching, by the processor core to a coherency synchronizer, a cache probe request based on the resolved physical memory address. In such implementations, issuing the cache probe to one or more caches includes dispatching, by the coherency synchronizer to the one or more caches, the cache probe before the processor core completes the PIM instruction.

In some implementations, eagerly invalidating or flushing PIM data also includes resolving, by a processor core, the physical memory address, where the physical memory address is specified in a cache control instruction associated with the PIM instruction and dispatching, by the processor core to a coherency synchronizer, a cache probe request based on the physical memory address. In such implementations, issuing the cache probe to one or more caches includes dispatching, by the coherency synchronizer to the one or more caches, the cache probe before the processor core completes the PIM instruction.

Additional methods of eagerly invalidating and flushing cached data used by PIM are disclosed. Such a method includes, based on at least one first PIM instruction specifying a first physical memory address, speculating a second physical memory address. Such a method also includes issuing a cache probe to one or more caches before encountering a second PIM instruction that specifies the second physical memory address. In such implementations, the cache probe is issued to one or more caches to invalidate or flush data associated with the second physical memory address. In such implementations, the second physical memory address is speculated based on a pattern of memory accesses of prior PIM instructions.

In some variations of the aforementioned method, eagerly invalidating and flushing cached data used by PIM also includes receiving, at a coherency synchronizer, the second PIM instruction after the second PIM instruction is dispatched by a processor core; determining, upon receipt of the second PIM instruction, whether probe responses to the cache probe have been received from the one or more caches; and dispatching the second PIM instruction to the PIM device when probe responses to the cache probe have been received from the one or more caches. In such a method, the coherency synchronizer synchronizes cache states for a plurality of processor cores.

For further explanation of the various implementations of the apparatus, products, and methods set forth, FIG. 1 sets for a block diagram illustrating an example system 100 that supports execution of PIM instructions. In the example of FIG. 1, the system 100 includes a multicore processor 101 that includes multiple core complexes 102, 104 that include a cluster of cores (e.g., 2 or more cores sharing a last-level cache or interface). For example, the processor 101 can be implemented in a system-on-chip (SoC) architecture. In the example depicted in FIG. 1, each core complex 102, 104 includes multiple processor cores 106, 108, 110, 112 (e.g., central processing unit (CPU) cores, graphical processing unit (GPU) cores, etc.) respectively coupled to second-level (L2) caches 114, 116, 118, 120. Further, each of the processor cores 106, 108, 110, 112 includes respective primary (L1) caches 122, 124, 126, 128. Each of the processor cores 106, 108, 110, 112 includes various components of a processor pipeline (not depicted) such as an instruction fetch, decode, and dispatch pipeline, prefetch input queues, schedulers, load/store queues, lookaside buffers, reorder buffers, and retire queues as well as various arithmetic logic units (ALUs) and register files.

The configuration of the example system 100 depicted in FIG. 1 is presented for the purpose of explanation. Readers will appreciate that, while four processor cores 106, 108, 110, 112 are depicted in FIG. 1, the processor 101 can include more or fewer processor cores than depicted, as well as more or fewer core complexes, as well as more or fewer caches.

In the example depicted in in FIG. 1, each core complex 102, 104 includes a third level (L3) cache 130, 132 that serves as an interconnect cache, or last level cache (LLC), that connects all of the L2 caches of a particular core complex. In some examples, the processor 101 is configured to execute multithreaded applications using the multiple processor cores 106, 108, 110, 112. In these examples, a modification of data in a cache in one core complex 102 affects the validity of data cached in another core complex 104. To enforce cache coherency, the processor 101 includes a coherency synchronizer 134 coupled to each L3 cache 130, 132 of the core complexes 102, 104. In these examples, the coherency synchronizer 134 initiates cache operations, for example, by transmitting cache probes to invalidate or flush data contained in cache entries of any L1, L2, or L3 cache present in the processor 101.

Each L1, L2, and L3 cache includes cache logic that, in response to a processor request, determines whether data associated with a requested operation is present in a cache entry of the cache. If the data is present (a 'cache hit'), the processor request is fulfilled using the data present in the cache entry. If the data is not present (a 'cache miss'), the request is forwarded to the next-level cache until a cache miss is detected in the LLC. In response to a cache miss in the LLC, the cache is forwarded to a memory controller 136 of the processor 101 to fulfill the request using data stored in main memory (e.g., memory device 138). In one example, the processor requests are input/output (I/O) operations, such as read/write requests, directed to a memory location in the memory device 138.

Each of the processor cores 106, 108, 110, 112 executes machine language code created by a compiler from an application that executes on the processor 101. For example, the application can be a single-threaded or multithreaded application. The processor cores implement an instruction set architecture (ISA) utilized by the compiler system for generating the machine language code. In one example, the ISA for the processor 101 is the x86-64 instruction set with support for advanced vector extension such as AVX-256.

In accordance with various implementations of the present disclosure, the processor 101 implements an extended ISA with three opcodes for offloading operations to PIM device as well an architected register file for the PIM device. In the extended ISA, a remote_load instruction opcode loads data of a memory operand from main memory into a local register of the PIM device, while a remote_store instruction opcode writes data from a local register of the PIM device to a memory operand in main memory. A remote_op instruction opcode in the extended ISA can represent any arithmetic or logical operation supported by the PIM device's fixed function architecture. None of the operations modifies control flow and thus the PIM instructions are executed in sequence. The remote_op instruction source operands can be (a) a memory address (specified in the same way as in the baseline ISA), (b) an architectural register (from the CPU standard ISA), or (c) a PIM register implemented in the PIM device. In some implementations, a PIM instruction destination operand can only be a PIM register. The PIM registers are architected registers within the extended ISA that represent registers local to the PIM fixed function logic and are allocated by the compiler. The PIM registers are virtual in that they have no physical storage in the processor core and are used to support data dependencies between PIM instructions and to track PIM register usage at the memory controller 136 when the PIM instructions are sent to the PIM fixed function module 146.

In some implementations, the remote_load instruction includes a destination operand that is an PIM register, a source operand that is a memory address, and another source operand that is an architectural register that is used to generate a memory address. The remote_load instruction indicates that the PIM device should load data from the memory location identified by the memory address into the PIM register.

In some implementations, the remote_store instruction includes a destination operand that is a memory address, a source operand that is an PIM register and another source operand that is an architectural register used to generate the memory address. The remote_store instruction indicates that the PIM device should store data from the PIM register to memory location identified by the memory address.

In some implementations, the remote_op instruction includes a destination operand that is an PIM register and source operands for a computation, where the source operands can be architectural registers (carrying values from prior non-offloaded computations), PIM registers or a memory address (generated from an architectural register also specified in the remote_op instruction). The remote_op instruction indicates that fixed function logic in the PIM device should perform the computation and place the result in the PIM register indicated by the destination operand.

In some implementations, the PIM instructions are generated by the compiler at application compile time using the extended ISA. In one example, the compiler identifies PIM instructions in source code based on indications in application source code provided by the programmer, for example, using an application programming interface (API) for offloading. In another example, the compiler identifies instructions for offloading to a PIM device based on a determination that the instructions are suitable for offloading. The PIM instructions can be identified as a region of interest (ROI) in the source code. Each dynamic instance of an ROI in the source code can be identified as an PIM transaction that includes one or more PIM instructions. For example, a PIM transaction can include remote_load instruction, one or more remote_op instructions, and a remote_store instruction. A PIM transaction can be a loop iteration or a subroutine or a subset of subroutine's body. The PIM transaction is a sequential piece of code and does not include any control flow changing instructions. In some examples, special instructions can mark the beginning and end of each PIM transaction.

In some implementations, a PIM instruction is fetched, decoded, and dispatched (e.g., by the front-end pipeline of the core), as would be performed for any typical non-PIM instruction. After the PIM instruction is dispatched and once the PIM instruction has been picked by a scheduler, core resources are used to generate virtual and/or physical addresses for any memory locations identified in the PIM instruction (e.g., in remote_load, remote_store and remote_op instructions that have a memory operand) and any values consumed by PIM instructions from core registers (e.g., computed from non-PIM instructions). After the virtual and/or physical addresses have been generated and the values from core registers are available, a PIM instruction is ready to retire. Even though PIM instructions are picked by a scheduler, these instructions do not execute in the core's ALUs (vector or scalar, integer or floating point), neither do they modify machine state when issued by the core, including architected registers and flags as defined in the core's standard ISA. PIM instructions are ready to retire as soon as they have completed the operations (address generation and/or reading values computed by non-PIM instructions) mentioned above without violating memory ordering. In the event of pipeline flushing (e.g., due to branch mispredictions, load-store forwarding data dependence violations, interrupts, traps, etc.), the PIM instructions can be flushed like conventional instructions because they occupy instruction window entries like non-PIM instructions. Further, because remote_op instructions do not execute on the core's ALUs, no arithmetic error traps are detected for them. However, other traps (e.g., for virtual or physical address generation, instruction breakpoints, etc.) generated by PIM instructions are detected and served inside the core pipeline with the same mechanisms used for non-PIM instructions.

Once the PIM instructions retire, the generated memory addresses and values of any core register operands are included in a PIM request generated for the PIM instruction. The PIM request includes the PIM instruction and the PIM register as well as any generated memory address or register values need to complete the PIM instruction and store the result in the PIM register. In some implementations, a PIM request first-in-first-out (FIFO) queue for the PIM requests is utilized to maintain programmatic sequence for the instructions as the PIM instructions retire. In one example, the PIM instruction is retired only when the end of a PIM transaction is reached in the PIM request FIFO. There can be one PIM request FIFO per thread if the core supports multithreading. Each PIM request is issued to the PIM device in program order by the core at retire time to be executed in the same program order remotely in the PIM device.

In some examples, after a PIM request is issued by a processor core 106, 108, 110, 112, the PIM request is received by the coherency synchronizer 134. The coherency synchronizer 134 performs cache operation on the various caches of the core complexes 102, 104 to ensure that any cache entries for virtual and/or physical addresses identified in the PIM request remain coherent. For example, when a PIM request includes as an operand a virtual and/or physical address, the coherency synchronizer 134 performs a cache probe to identify cache entries in the L1, L2, and L3 caches of the core complex that contain cache entries for the virtual and/or physical addresses identified in the PIM request. If the identified cache entry contains clean data, the cache entry is invalidated. If the identified cache entry contains dirty data, the data in the cache entry is flushed to main memory (i.e., the memory device). In some examples, cache entries corresponding to virtual and/or physical addresses identified in the PIM request issued by a particular core in a core complex can be invalidated/flushed before reaching the coherency synchronizer 134, such that the coherency synchronizer 134 performs the cache probe only on other core complexes in the system 100. In other examples, the coherency synchronizer 134 receives the PIM request directly and performs the cache probe on all core complexes in the system 100. A memory fence can be employed to ensure that younger non-PIM instructions in the instruction queue do not access any cache entries for virtual and/or physical addresses identified in the PIM request(s) until those cache entries have been invalidated or flushed. In this way, the younger non-PIM instructions are prevented from accessing stale cache data and must instead retrieve the data from main memory (which may have been modified by a prior PIM request). After the appropriate cache operations have completed, the PIM request is transmitted to the memory controller 136 for offloading to the PIM device. The operation of the coherency synchronizer will be described in greater detail below.

In some implementations, the memory controller 136 receives the PIM requests, which can be configured as read or write requests with a flag that indicates the request is a PIM request. In these implementations, the memory controller 136 decodes the request to determine that the request is a PIM request and identifies the PIM instruction as well as operands for completing the PIM request. The memory controller 136 identifies the requested operation via a pointer to a command buffer located in the PIM device from the PIM request. The memory controller 136 breaks the PIM request into one or more commands that are transmitted to the PIM device.

In the example depicted in FIG. 1, the processor 101 is coupled to a memory device 138 that includes one or more memory arrays 142 for storing data. In some examples, the memory device 138 is a stacked dynamic random-access memory (DRAM) device that includes multiple memory dies stacked on a memory interface logic die that interface with the processor 101. For example, the memory device 138 can be a high bandwidth memory (HBM) module or a hybrid memory cube (HMC) module. In other examples, the memory device 138 can be an in-line memory module such as a dual in-line memory module (DIMM) that includes memory interface logic. The memory controller 136 issues commands to the memory logic 140 of the memory device 138, such as read requests, write requests, and other memory operations. In some implementation, commands transmitted to the memory device 138 by the memory controller 136 can be flagged as PIM commands.

In the example of FIG. 1, the memory device 138 implements a PIM device in that the memory logic 140 is designed to perform memory operations and a set of non-memory operations or functions (e.g., arithmetic and logical operations) within the memory device 138. In some implementations, the memory device 138 includes a separate register file 144 that can be used to provide operands to operate on by the functions.

In implementations where the PIM device is included as a component of the memory device 138, such as that of FIG. 1, the memory device 138 receives PIM instructions from the memory controller 136. In the example depicted in FIG. 1, the memory controller includes memory logic 140 that is coupled to a fixed function module 146 for implementing fixed functions identified in a PIM request. The fixed function module 146 can include a command buffer that is populated with the commands to be executed by the fixed function module 146. In some implementations, the opcode of each PIM instruction includes an embedded pointer to the command for the operation (load, store, add, subtract, multiply, increment, etc.) that is too be performed in the PIM device. When a PIM request is generated from a PIM instruction, this pointer is also included in the PIM request. In these implementations, when generating the commands, the memory controller uses the pointer in the PIM request to identify the location in the command buffer of the PIM device that includes the actual command for the operation.

Consider an example where the memory device implements a PIM device and, at compile time, the compiler system allocates a register r1 in the register file 144 and issues a multiply instruction to the fixed function module 146. In this simplified example, consider that the core 106 receives the following instructions:

```
pimLd r1, [5000];
pimOp r1, r1, 10;
pimSt [6000], r1;
```

where pimLd is a remote_load instruction, pimOp is a remote_op instruction, and pimSt is a remote_store instruction. The core generates PIM requests that are transmitted to the memory controller, as previous discussed. The memory controller 136 receives a sequence of PIM requests (received in the same program order indicated in the original machine code). In this example, the memory controller 136 receives a first PIM request that includes a load operation with a destination operand that is register r1, a source operand that is physical memory address 5000 in a memory array 142 and a pointer to the load instruction in the fixed function module 146. The memory controller 136 transmits one or more commands to the memory logic 140 for reading the address 5000 and loading the data into register r1 in the register file 144. The memory controller 136 then receives a second PIM request that includes a remote execution instruction with a destination operand that is register r1, a source operand that is register r1, and a source operand that is a scalar value (e.g., 10) obtained from the PIM request, as well as a pointer to the multiply instruction in the fixed function module 146. The memory controller 136 transmits one or more commands to the memory logic 140 for executing the multiply instruction in the fixed function module 146, where an ALU of the memory logic 140 is used to multiply the data in r1 by 10, and the result is written to register r1. The memory controller 136 then receives a third PIM request that is a store operation with a destination operand that is physical memory address 6000 in a memory array 142 a source operand that is register r1. The memory controller 136 transmits one or more commands to the memory logic 140 for storing the data in register r1 in a memory location identified by the physical memory address 6000.

In some examples, the coherency synchronizer 134 and memory controller 136 can be implemented on an I/O die 150 that is distinct from dies 154, 156 implementing the core complexes 102, 104. The I/O die 150 can be coupled through one or more channels to a memory interface die (not shown) that includes the memory logic 140 and fixed function module 146. One or more memory components each including a memory array 142 can be stacked on top of the memory interface die and coupled to the memory interface die using through-silicon vias. The I/O die 150 can be coupled to the core complex dies 154, 156 through an on-chip fabric.

The system of FIG. 1 may be configured to eagerly invalidate and flush PIM data from caches in accordance with various implementations of the present disclosure. For example, the coherency synchronizer 134 of the I/O die 150 of FIG. 1 is configured to receive a cache probe request. The cache probe request includes a physical memory address associated with a PIM instruction that is to be offloaded to the PIM device implemented in the memory device 138 for execution. The coherency synchronizer 134, based on the physical memory address of the PIM instruction, issues a cache probe to one or more of the caches 130, 132, 114, 116, 118, 120, 122, 124, 126, 128 prior to receiving the PIM instruction for dispatch to the PIM device. That is, the coherency synchronizer 134 initiates either a flush or invalidation of PIM data from the caches before the coherency synchronizer even receives the PIM instruction itself. In this way, the PIM instruction need not wait in a queue until the entire time the cache probe is propagated through the cache system. Instead, the cache probe begins propagation well before the PIM instruction arrives.

The system of FIG. 1 may also be configured to eagerly invalidate and flush PIM data from caches in other manners. For example, in the system of FIG. 1 the coherency synchronizer 134, based upon a first PIM instruction that specifies a first physical memory address, can speculate a physical memory address for a not-yet-received and possibly never-to-be-received PIM instruction. Then, in a completely speculative fashion, the coherency synchronizer 134 can issue a cache probe to one or more caches based on the second physical memory address. That is, even before encountering a PIM instruction that specifies the second physical memory address, the coherency synchronizer can preemptively and speculatively initiate a cache probe to flush PIM data from or invalidate PIM resident in the caches 114, 116, 118, 120, 130 132, 122, 124, 126, 128. The speculation of the memory address can be based on a previous or a pattern of previous PIM instructions or addresses related to those PIM instructions.

While the system of FIG. 1 sets forth an example architecture that supports PIM execution in which PIM is supported in a memory device itself, as noted above, PIM may be implemented in a variety of different manners. For further explanation, therefore, FIG. 2 sets for a block diagram illustrating another example system 200 that supports execution of PIM instructions in which the PIM device is implemented as an accelerator 238 coupled to a memory device 250.

The accelerator 238 is used by the processor 101 to remotely execute PIM instructions. For example, the PIM instructions can be loop iterations, a subroutine, a subset of subroutine's body, or other sequential piece of code as discussed above. In these implementations, the accelerator 238 behaves similarly to the memory device 138 that is configured as a PIM device, as discussed above, in that the extended ISA implemented by the processor 101 may be utilized for offloading instructions to the accelerator 238.

The accelerator 238 includes accelerator logic such as processing resources designed to perform memory operations (load/store) and non-memory operations (e.g., arithmetic and logical operations) within the accelerator 238. For example, the accelerator 238 can load data from the memory device 250, perform computations on data, and store data in the memory device 250. In some implementations, the accelerator 238 is designed to implement a set of fixed functions, which can be executed by the accelerator logic 240. In these implementations, the accelerator 238 includes a register file 244 used to provide the operands needed to execute the fixed functions. Registers in the register file 244 can be targeted in PIM instructions as source or destination operands using the extended ISA discussed above.

The accelerator 238 receives PIM instructions generated from the PIM requests from the memory controller 136 of the processor 101. In the example depicted in FIG. 2, the accelerator logic 240 is coupled to a PIM fixed function module 246 for implementing a set of fixed functions identified in a PIM request. The fixed function module 246 can include a command buffer that stores the actual commands to be executed by the fixed function module 246. The command buffer is populated by the operating system when an application thread including the PIM instructions is launched. The processing of PIM instructions is similar to the processing of PIM instructions performed by the memory device 138 as discussed above, except that the memory array is not local to the accelerator 238 as it is in the memory device 138.

Figure 2:
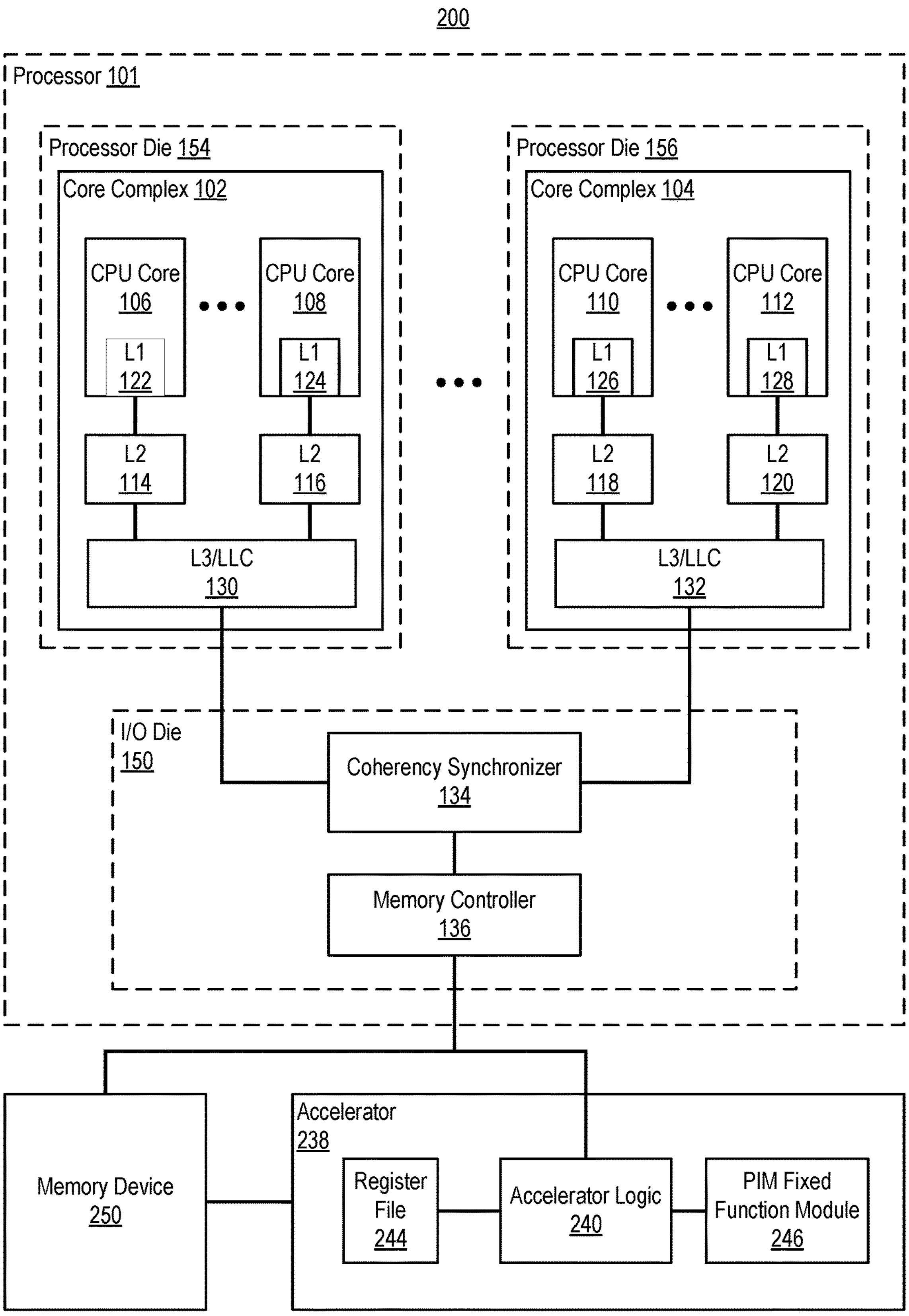
FIG. 2 sets for a block diagram illustrating another example system that supports execution of PIM instruction in which the PIM device is implemented as an accelerator coupled to a memory device.

The system of FIG. 2 may carry out the various implementations described herein of eagerly invalidating or flushing PIM data from the caches. Some of the implementations are described above with respect to FIG. 1 and operate in a similar manner except that the PIM device, rather than being implemented as part of the memory device itself is implemented as an accelerator that is a separate component from the memory device.

Figure 3:
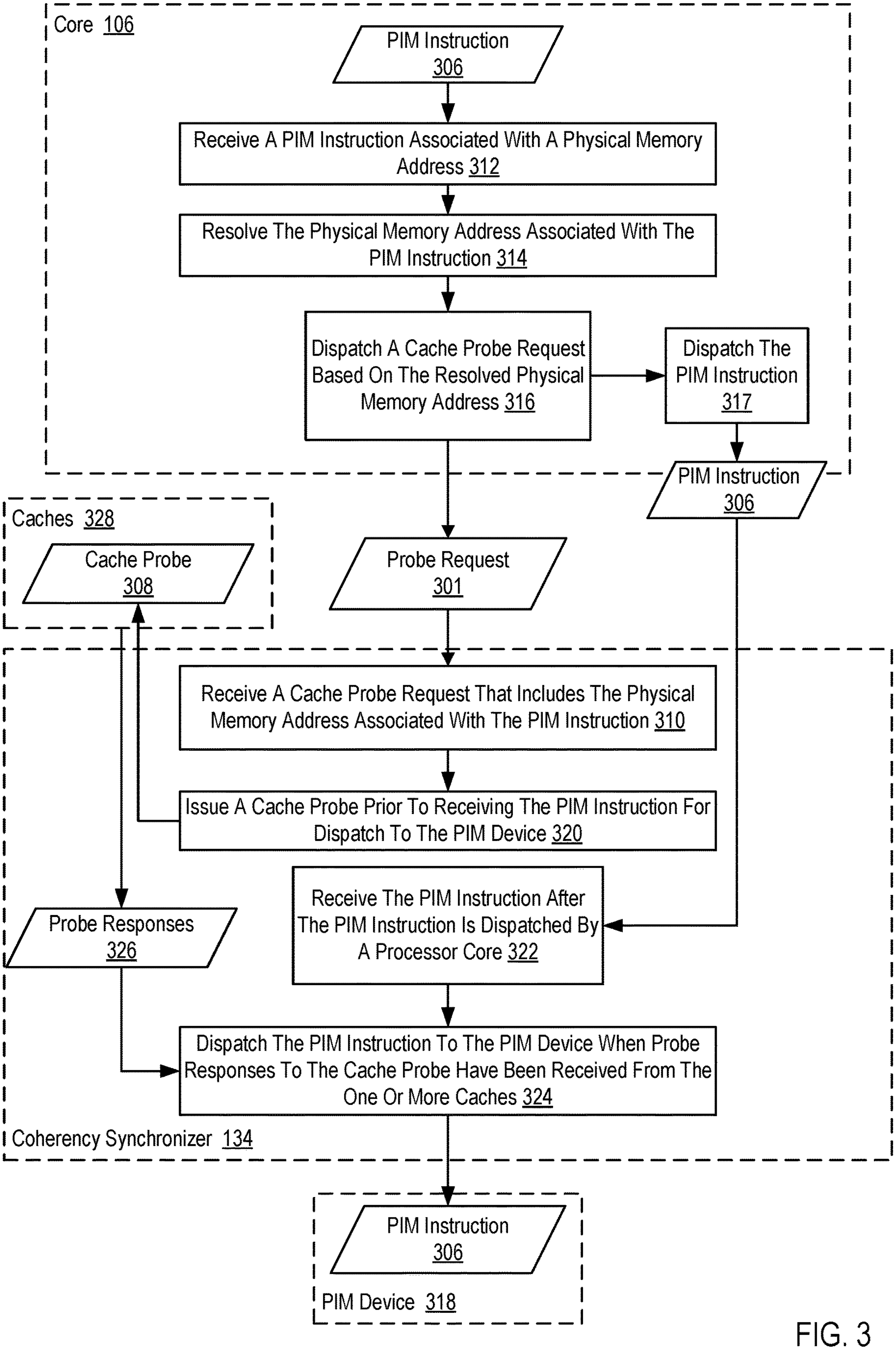
FIG. 3 sets forth a flow chart illustrating an example method of eagerly invalidating and flushing cached data used by PIM instructions according to implementations of the present disclosure.
Figure 4:
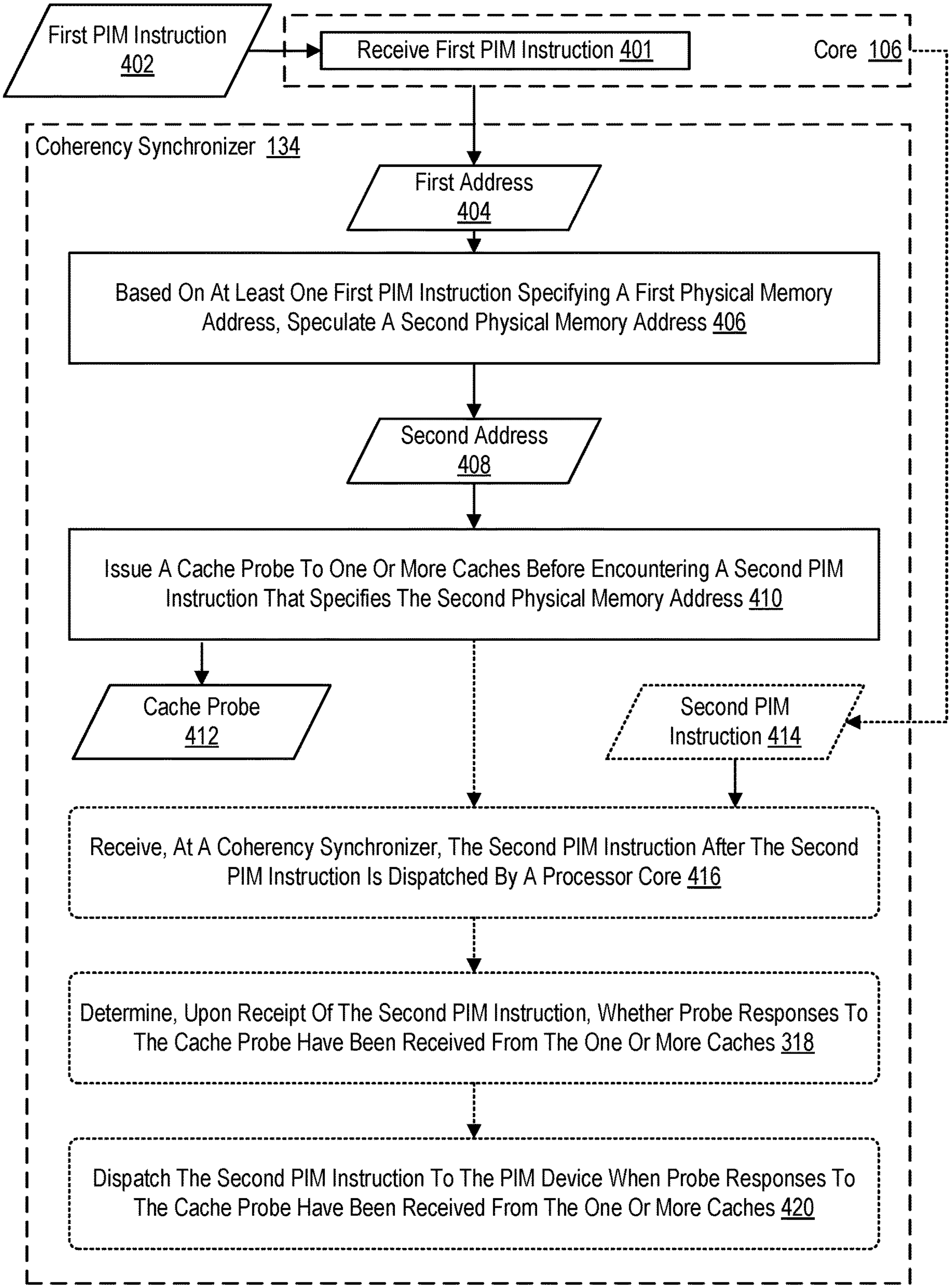
FIG. 4 sets forth a flowchart illustrate a method of eagerly invalidating and flushing cached PIM data through speculative issuance of cache probes according to implementations of the present disclosure

For further explanation, FIGS. 3 and 4 set forth flow charts illustrating various example methods of eagerly invalidating and flushing cached data used by PIM instructions according to implementations of the present disclosure. Each of the methods can be carried out in and by the example systems of FIGS. 1 and 2 above.

Beginning with FIG. 3, a processor core 106 receives 312 one or more PIM instructions 306 where at least one of the PIM instructions includes a memory operand. For example, the memory operand can specify a memory location that is the target of a load or store operation to be performed in a PIM device. In some examples, the PIM instruction 306 is part of a kernel that is offloaded for execution by the PIM device. For example, the PIM instruction 306 can be part of a loop of instructions. The region of source code or machine language code that includes the PIM instruction can be marked with a start region marker and an end region marked that is inserted by the application developer or by the compiler.

A PIM instruction is considered "executed" in the core 106 by resolving 314 memory addresses and data dependencies for the PIM instruction 306. Metadata, such as the resolved physical memory address and operand from core 106 registers, is coupled with the PIM instruction and ultimately dispatched to the PIM device.

The memory address may be provided to the core 106 for resolving (from a virtual address to physical address for example) int various forms. In some forms, the memory address resolved 314 by the core 106 is received as part of the PIM instruction 306 itself. In other implementations, the memory address is specified in a cache control instruction associated with the PIM instruction. A cache control instruction is an instruction to flush, invalidate, or flush and invalidate a cache line associated with a memory address. The cache control instruction can be included by an application developer or by a compiler in source code or machine code for the application or thread containing the PIM instruction 306. For example, the cache control instruction can be a flush cache line (CLFUSH) or Data Cache Block Flush (DCBF) instruction to flush a cache line, or a Data Cache Block Invalidate (DCBI) instruction to invalidate a cache line. Such cache control instructions and variants thereof are supported by several processor instruction set architectures, including PowerPC and x86.

In some implementations, a cache control instruction is interleaved in a plurality of PIM instructions. For example, a cache control instruction can be executed by the core 106 in a loop of PIM instructions prior to executing a PIM instruction 306 that targets the memory address identified in the cache control instruction. In other examples, a cache control instruction is executed by a core 106 prior to entering a code sequence that includes one or more PIM instructions 306. For example, a cache control instruction can be executed prior to a transaction-start instruction that signifies the beginning of a series of PIM instructions 306. In this way, the cache control instruction that targets a physical memory address is executed before a PIM instruction that targets the same physical memory address to allow the developer or compiler to ensure that the PIM instruction is using the most recent data and that other non-offload instructions do not access stale data.

Once the processor core 106 resolves 314 the physical memory address associated with the PIM instruction 306, the processor core 106 dispatches 316 a cache probe request 301 based on the resolved physical memory address to the coherency synchronizer 134. The cache probe request notifies the coherency synchronizer to invalidate or flush cache entries in system caches associated with the physical memory address.

The coherency synchronizer receives 310 the cache probe request 301 and issues 320 a cache probe 308 to one or more caches based on the physical memory address prior to receiving the PIM instruction 306 for dispatch to the PIM device. The cache probe 308 can be a probe to invalidate a clean cache line associated with the physical memory address, a probe to flush a dirty cache line associated with the physical memory address, or a probe to flush and invalidate a dirty cache line associated with the physical address. For example, the cache probe 308 can flush dirty data in a cache entry corresponding to the physical memory address to be read by a remote_load instruction when executed at the PIM device to ensure that the PIM device utilizes the most current data that is stored in the cache entry. In some examples, the cache probe 308 can invalidate data in a cache entry corresponding to a physical memory address that is the destination of a remote_store instruction when executed at the PIM device so that younger instructions do not read stale data. Each cache that receives the cache probe 308 sends a probe response back to the system probe filter indicating the appropriate cache operations have completed.

In some implementations, the cache coherency synchronizer issues 320 the cache probe 308 by employing a system probe filter to identify caches in the processor system, including caches across multiple core complexes, that hold data associated with the physical memory address. The system probe filter issues the cache probe prior to the coherency synchronizer 134 receiving the PIM request. That is, for a PIM instruction that targets the physical memory address, the cache probe is issued from the system probe filter before the PIM instruction is dispatched from the core 106 to the coherency synchronizer. In this way, cache flushing and invalidating of PIM data can be initiated earlier in time than would have otherwise occurred and PIM instruction dispatch throughput may be increased.

The method of FIG. 3 continues by the processor core 106 dispatching 317 the PIM instruction. As mentioned above, the core 106 places the PIM instruction in a PIM queue for later dispatch through the memory controller to the PIM device. As such, the PIM instruction often is held in that PIM queue for a relatively long period of time. Once the core 106 eventually dispatches the PIM instruction 306 to the PIM device through the memory controller (not shown in this figure), the coherency synchronizer 'receives' 322 the PIM instruction from the core 106 by intercepting the PIM instruction prior to the instruction reaching the memory controller (136 in FIG. 1 and FIG. 2). The core 106 dispatches 317 the PIM instruction along with operators and operands for the PIM instruction as well as metadata such as the resolved memory address, scalar values utilized by the PIM instruction, and so on. Additionally, the PIM instruction may be included in a group of similar PIM instructions with associated operators, operands, and metadata. The path of the dispatch of a PIM instruction begins at the core 106 and travels through the memory controller (136 in FIG. 1 and FIG. 2) which will eventually dispatch the PIM instruction to the PIM device. The coherency synchronizer intercepts the PIM instruction between the core 106 and the memory controller. In some implementations, the coherency synchronizer 134 receives the PIM instruction 306 directly from the core 106, bypassing the caches 328, after the core 106 retires the PIM instruction. The caches 328 in the example of FIG. 3 include all of the L1, L2, L3/LLC caches displayed in FIG. 1 and FIG. 2.

After the PIM instruction is received from the core 106, the coherency synchronizer 134 determines whether probe responses 326 for the cache probe 308 have been received from the caches 328. A cache probe response indicates that the cache line invalidation or cache line flush operation (whichever was requested in the cache probe) has completed. In the method of FIG. 3, when a probe response has been received for all caches to which a cache probe has been sent, the coherency synchronizer 134 dispatches 324 the PIM instruction 306 to the PIM device 318. That is, the PIM instruction need only wait to be dispatched to the PIM device until the cache probe related to that PIM instruction is completed. In addition, the cache probe was initiated prior to the PIM instruction's arrival at the coherency synchronizer 134. It is noted that the coherency synchronizer 134 dispatches 324 the PIM instruction 'to the PIM device' in that the coherency synchronizer forwards the PIM instruction to the memory controller which then dispatches the instruction to the PIM device.

By the time the PIM instruction 306 is dispatched from the core 106, the cache probe 308 is already in flight and, in some cases, the coherency synchronizer 134 may have already received some or all the probe responses. When the PIM instruction arrives at the coherency synchronizer, the system probe filter will determine that the cache probe 308 has already been issued for the physical memory address identified in the PIM instruction. If probe responses have been received for the cache probe 308, the PIM instruction is dispatched to the memory controller for eventual PIM execution. If the cache probe responses have not been received, the PIM instruction waits at the coherency synchronizer 134 until the responses have been received, at which time the PIM instruction can be dispatched to the memory controller. Although the PIM instruction may still wait at the coherency synchronizer for probe responses to be received, probe response latency is greatly reduced by issuing the cache probes before the PIM instruction is received at the system probe filter of the coherency synchronizer 134.

In some embodiments, probe response latency can be reduced even more through speculative issuance of cache probes. For further explanation, therefore, FIG. 4 sets forth a flowchart illustrating a method of eagerly invalidating and flushing cached PIM data through speculative issuance of cache probes according to implementations of the present disclosure. The method of FIG. 4 includes a processor core 106 receiving 401 a first PIM instruction 402. In the example of FIG. 4, the first PIM instruction 402 includes or is otherwise associated with a first memory address. The core 106 may resolve the memory address and provide the memory address to a coherency synchronizer 134 in a similar manner to that described above.

Based on at (at least) the first PIM instruction 402 and the first physical memory address 404, the coherency synchronizer 134 speculates 406 a second physical memory address. In some implementations, for example, the cache coherency synchronizer may identify a pattern of previous PIM instruction memory addresses and speculate one or more additional memory addresses. This may be especially accurate for loops in which the same patterns of PIM instructions and the corresponding memory addresses are utilized in a repetitive manner.

Once the second address 408 is speculated, the coherency synchronizer issues 410 a cache probe 412 to one or more caches. The cache probe 412 in this example is an indication to caches to flush, invalidate, or flush and invalidate cache lines that include data at the second address 408. It is noted that the cache probe here is issued in some cases before a second PIM is ever received at the core for execution. In fact, in some cases a second PIM instruction associated with the second address 408 may never arrive at the core 106. Said another way, the cache probe 412 for the second address is speculatively issued before ever encountering a second PIM instruction that specifies the second physical memory address.

In some instances, however, the coherency synchronizer 134 receives 416 the second PIM instruction 414 after the second PIM instruction 414 is dispatched by the processor core 401. In such an example, the cache coherency synchronizer 134 then determines whether probe responses to the cache probe 412 for the second address 408 have been received from the caches. When all required probe responses have been received, the coherency synchronizer 134 dispatches 420 the second PIM instruction 414 to the PIM device (through the memory controller for execution). In this way, well before a PIM instruction is received at the coherency synchronizer, a cache flush or invalidation of data used by the PIM instruction may initiated. Thus, latency of cache probe responses and the resulting latency of executing a PIM instruction is reduced.

In view of the above description, readers will appreciate the above implementations directed to eagerly invalidating and flushing cached data used by offloaded operations in accordance with the present disclosure provide numerous advantages. Readers will appreciate that the above-described mechanisms for early data invalidation and flushing from caches will improves the dispatch bandwidth of offloaded computations to remote execution logic, such as PIM devices. PIM requests will spend less time in queues waiting for cache probe responses prior to being dispatched to the remote execution logic. Readers will appreciate that implementations enable high dispatch bandwidth of work to remote execution logic by eagerly invalidating and flushing data lines from caches that will be utilized by the remote execution logic. Readers will appreciate that implementations will reduce the coherence overhead experienced by request traffic destined for the remote execution logic, thereby improving the PIM request arrival rate at the remote execution logic and overall performance.

Implementations can be a system, an apparatus, a method, and/or logic circuitry. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A system-on-chip comprising:
one or more processor cores;
one or more caches; and
an I/O (input/output) die configured to:
receive a cache probe request from a processor core prior to receiving a PIM (Processing-in-Memory) instruction, wherein the cache probe request includes a physical memory address associated with the PIM instruction, and the PIM instruction is to be offloaded to a PIM device for execution, and wherein the cache probe request notifies the I/O die to invalidate or flush cache data;
issue, based on the physical memory address, a cache probe to one or more of the caches prior to receiving the PIM instruction, including one or more operators of the PIM instruction, for dispatch to the PIM device; and
issue, based on a second physical memory address that is based on a pattern of prior memory accesses, another cache probe to one or more of the caches before encountering a second PIM instruction that specifies the second physical memory address.

2. The system-on-chip of claim 1, wherein the cache probe is issued to one or more caches to invalidate or flush data associated with the physical memory address.

3. The system-on-chip of claim 1, wherein the I/O die further comprises a coherency synchronizer comprising logic to:
dispatch, after receiving the PIM instruction, the PIM instruction to the PIM device based on receiving a cache probe response from each of the one or more caches.

4. The system-on-chip of claim 3, wherein the coherency synchronizer is further configured to synchronize cache states for a plurality of processor cores.

5. The system-on-chip of claim 1, wherein a processor core is configured to:
resolve the physical memory address associated with the PIM instruction; and
dispatch, to a coherency synchronizer of the I/O die, one or more cache probe requests based on the resolved physical memory address, wherein the cache coherency synchronizer issues the cache probe to the one or more caches before the processor core completes dispatching of the PIM instruction.

6. The system-on-chip of claim 1, wherein a processor core is further configured to:

resolve the physical memory address, wherein the physical memory address is specified in a cache control instruction associated with the PIM instruction; and dispatch, to a coherency synchronizer of the I/O die, a cache probe request based on the physical memory address, wherein the cache coherency synchronizer issues the cache probe to the one or more caches before the processor core completes the PIM instruction.

7. A method of invalidating and flushing cached data used by PIM (Processing-in-Memory) instructions comprising:

receiving, by an I/O (input/output) die, a cache probe request from a processor core prior to receiving a PIM instruction, wherein the cache probe request includes a physical memory address associated with the PIM instruction, wherein the PIM instruction is to be offloaded to a PIM device for execution, and wherein the cache probe request notifies the I/O die to invalidate or flush cache data;

issuing, by the I/O die, a cache probe to one or more caches based on the physical memory address prior to receiving, by the I/O die, the PIM instruction, including one or more operators of the PIM instruction, for dispatch to the PIM device; and issuing, based on a second physical memory address that is based on a pattern of prior memory accesses, another cache probe to one or more of the caches before encountering a second PIM instruction that specifies the second physical memory address.

8. The method of claim 7, wherein the cache probe is issued to one or more caches to invalidate or flush data associated with the physical memory address.

9. The method of claim 7 further comprising:

receiving, at a coherency synchronizer, the PIM instruction after the PIM instruction is dispatched by a processor core;

determining, upon receipt of the PIM instruction, whether probe responses to the cache probe have been received from the one or more caches; and dispatching the PIM instruction to the PIM device based on determining that the probe responses to the cache probe have been received from the one or more caches.

10. The method of claim 9, wherein the coherency synchronizer synchronizes cache states for a plurality of processor cores.

11. The method of claim 7 further comprising:

resolving, by a processor core, the physical memory address, wherein the physical memory address is specified in the PIM instruction; and dispatching, by the processor core to a coherency synchronizer, one or more cache probe requests based on the resolved physical memory address, wherein issuing the cache probe to one or more caches includes dispatching, by the coherency synchronizer to the one or more caches, the cache probe before the processor core completes dispatching of the PIM instruction.

12. The method of claim 7 further comprising:

resolving, by a processor core, the physical memory address, wherein the physical memory address is specified in a cache control instruction associated with the PIM instruction; and dispatching, by the processor core to a coherency synchronizer, a cache probe request based on the physical memory address, wherein issuing the cache probe to one or more caches includes dispatching, by the coherency synchronizer to the one or more caches, the cache probe before the processor core completes the PIM instruction.

13. A method of invalidating and flushing cached data used by PIM (Processing-in-Memory) instructions, the method comprising:

based on at least one first PIM instruction specifying a first physical memory address, speculating a second physical memory address; and issuing a cache probe to one or more caches before encountering a second PIM instruction that specifies the second physical memory address.

14. The method of claim 13, wherein the cache probe is issued to one or more caches to invalidate or flush data associated with the second physical memory address.

15. The method of claim 13 further comprising:

receiving, at a coherency synchronizer, the second PIM instruction after the second PIM instruction is dispatched by a processor core;

determining, upon receipt of the second PIM instruction, whether probe responses to the cache probe have been received from the one or more caches; and dispatching the second PIM instruction to a PIM device when probe responses to the cache probe have been received from the one or more caches.

16. The method of claim 15, wherein the coherency synchronizer synchronizes cache states for a plurality of processor cores.

17. The method of claim 13, wherein the second physical memory address is speculated based on a pattern of memory accesses of prior PIM instructions.

18. A system-on-chip for invalidating and flushing cached data used by PIM (Processing-in-Memory) instructions comprising:

one or more processor cores;

one or more caches; and an I/O (input/output) die comprising logic to:

based on at least one first PIM instruction specifying a first physical memory address, speculate a second physical memory address; and issue a cache probe to one or more caches before encountering a second PIM instruction that specifies the second physical memory address.

19. The system-on-chip of claim 18, wherein the I/O die further comprises a coherency synchronizer configured to:

receive the second PIM instruction after the second PIM instruction is dispatched by a processor core;

determine, upon receipt of the second PIM instruction, whether probe responses to the cache probe have been received from the one or more caches; and dispatch the second PIM instruction to a PIM device when probe responses to the cache probe have been received from the one or more caches.

20. The system-on-chip of claim 18, wherein the second physical memory address is speculated based on a pattern of memory accesses of prior PIM instructions.

* * * * *